United States Patent
Inoue et al.

(10) Patent No.: US 12,531,318 B2
(45) Date of Patent: Jan. 20, 2026

(54) FLAT-SHAPED BATTERY AND METHOD FOR MANUFACTURING SAME

(71) Applicant: MAXELL, LTD., Kyoto (JP)

(72) Inventors: Yusuke Inoue, Kyoto (JP); Yoshihisa Hirose, Kyoto (JP); Takahiro Furutani, Kyoto (JP)

(73) Assignee: MAXELL, LTD., Kyoto (JP)

( * ) Notice: Subject to any disclaimer, the term of this patent is extended or adjusted under 35 U.S.C. 154(b) by 477 days.

(21) Appl. No.: 17/915,654

(22) PCT Filed: Mar. 23, 2021

(86) PCT No.: PCT/JP2021/011972
§ 371 (c)(1),
(2) Date: Sep. 29, 2022

(87) PCT Pub. No.: WO2021/200398
PCT Pub. Date: Oct. 7, 2021

(65) Prior Publication Data
US 2023/0112808 A1    Apr. 13, 2023

(30) Foreign Application Priority Data

Mar. 30, 2020   (JP) .................................. 2020-059937
Jan. 27, 2021   (JP) .................................. 2021-010733

(51) Int. Cl.
*H01M 50/109*      (2021.01)
*H01M 10/0563*    (2010.01)
(Continued)

(52) U.S. Cl.
CPC ..... *H01M 50/668* (2021.01); *H01M 10/0563* (2013.01); *H01M 10/287* (2013.01);
(Continued)

(58) Field of Classification Search
CPC . H01M 50/668; H01M 50/109; H01M 50/184
See application file for complete search history.

(56) References Cited

U.S. PATENT DOCUMENTS 3,920,478 A     11/1975   Kozawa
4,552,821 A  *  11/1985   Gibbard ................ H01M 10/34
                                                        429/57
(Continued)

FOREIGN PATENT DOCUMENTS

EP         1703574 B1    11/2016
JP      S54-102617 A      8/1979
(Continued)

OTHER PUBLICATIONS

Extended (Supplementary) European Search Report dated Aug. 7, 2024, issued in counterpart EP Application No. 21780665.2. (8 pages).

(Continued)

*Primary Examiner* — Kenneth J Douyette
(74) *Attorney, Agent, or Firm* — WHDA, LLP

(57) ABSTRACT

The flat-shaped battery of the present invention comprises a battery container provided with an outer can and a sealing plate, and a positive electrode, a negative electrode, a separator, and an electrolyte solution are enclosed in the battery container. The positive electrode is housed in the outer can, and a porous electrolyte solution absorber is inserted between the positive electrode and an inner bottom surface of the outer can. Also, the method for manufacturing a flat-shaped battery, including: disposing an electrolyte solution absorber on an inner bottom surface of the outer can; disposing the positive electrode on the electrolyte solution absorber; and injecting the electrolyte solution into the outer can after disposing the electrolyte solution absorber, before or after disposing the positive electrode. A porous body having a porosity of 40 to 90% is used as the electrolyte solution absorber.

9 Claims, 1 Drawing Sheet

(51) Int. Cl.
- *H01M 10/28* (2006.01)
- *H01M 50/184* (2021.01)
- *H01M 50/60* (2021.01)
- *H01M 50/609* (2021.01)

(52) U.S. Cl.
CPC ....... *H01M 10/288* (2013.01); *H01M 50/109* (2021.01); *H01M 50/184* (2021.01); *H01M 50/609* (2021.01)

(56) References Cited

U.S. PATENT DOCUMENTS

| | | | |
|---|---|---|---|
| 7,914,926 B2 | 3/2011 | Kimura et al. | |
| 2009/0017385 A1* | 1/2009 | Harada | H01M 50/446 429/255 |
| 2019/0221891 A1* | 7/2019 | Lockett | H01M 10/0585 |

FOREIGN PATENT DOCUMENTS

| | | |
|---|---|---|
| JP | H01-157058 A | 6/1989 |
| JP | 2001-266893 A | 9/2001 |
| JP | 2001-345105 A | 12/2001 |
| JP | 2011-154789 A | 8/2011 |
| JP | 2020-119628 A | 8/2020 |
| KR | 101634144 B1 | 6/2016 |

OTHER PUBLICATIONS

International Search Report dated May 25, 2021, issued in Counterpart Application No. PCT/JP2021/011972. (2 pages).

* cited by examiner

FLAT-SHAPED BATTERY AND METHOD FOR MANUFACTURING SAME

TECHNICAL FIELD

The present invention relates to a flat-shaped battery that is excellent in productivity, and a method for manufacturing the battery.

BACKGROUND ART

In a flat-shaped battery in which a positive electrode, a negative electrode, a separator, and an electrolyte solution are enclosed in a battery container that is formed of an outer can serving as a positive electrode terminal, and a sealing plate serving as a negative electrode terminal, a method typically employed to house the positive electrode and the electrolyte solution in the outer can is as follow; the electrolyte solution is injected in advance into the outer can, and then the positive electrode and the separator are disposed in this outer can, or in which the positive electrode is first disposed in the outer can, and then the electrolyte solution is injected directly onto the positive electrode or onto the separator placed on the positive electrode.

However, even when the positive electrode is in contact with the electrolyte solution, the electrolyte solution is not promptly absorbed into the positive electrode, and thus, in the former process, when the positive electrode is inserted into the outer can into which the electrolyte solution has been injected, the liquid surface of the electrolyte solution could result in a rise depending on the volume of the positive electrode. Here, if the separator disposed on the positive electrode can promptly absorb the rising electrolyte solution, a problem where the electrolyte solution overflows from the outer can will not occur. However, it takes a certain amount of time for the separator to absorb the electrolyte solution, and thus the problem of leakage of the electrolyte solution is likely to occur with an increase in the amount of electrolyte solution that is injected into the outer can.

On the other hand, in the latter process, the electrolyte solution dripped onto the positive electrode (or onto the separator) flows into gaps between the side wall of the outer can and the positive electrode. Since it takes time for the separator and the positive electrode to absorb the electrolyte solution, the problem of leakage of the electrolyte solution is still likely to occur with an increase in the amount of electrolyte solution.

On the other hand, techniques for preventing leakage of an electrolyte solution during manufacturing of a flat-shaped battery have also been proposed. For example, Patent Documents 1 and 2 describe techniques in which a recess is provided on the bottom side of a positive electrode can for a positive electrode mixture, so that the dripped electrolyte solution is accumulated in the recess, thereby preventing leakage thereof.

Patent Document 3 describes a technique in which a positive electrode is enclosed in a pouch-like body, which is made of an electrolyte solution retaining material (separator) and a liquid-tight film, to allow the electrolyte solution retaining material to absorb an electrolyte solution, and the pouch-like body is assembled into a battery container.

PRIOR ART DOCUMENTS

Patent Documents

[Patent Document 1] JP 2011-154789A
[Patent Document 2] JP 2020-119628A
[Patent Document 3] JP H1-157058A

DISCLOSURE OF INVENTION

Problem to be Solved by the Invention

However, in the methods of Patent Documents 1 and 2, there is a possibility that not only the capacity of the positive electrode could decrease, but also air bubbles could remain in the recess formed in a downward direction and the electrolyte solution could not be accumulated in the recess.

Also, in the method of Patent Document 3, the process is complicated, and an electrical connection between the positive electrode and the battery container becomes difficult due to the liquid-tight film provided therebetween.

Accordingly, there is a demand for developing a technique for improving the productivity of a flat-shaped battery, while suppressing property degradation and the like and preventing leakage of an electrolyte solution during manufacturing.

In view of the above situation, it is an object of the present invention to provide a flat-shaped battery that is excellent in productivity, and a method for manufacturing the battery.

Means for Solving Problem

The flat-shaped battery of the present invention is directed to a flat-shaped battery in which a positive electrode, a negative electrode, a separator, and an electrolyte solution are enclosed in a battery container provided with an outer can and a sealing plate, wherein the positive electrode is housed in the outer can, and a porous electrolyte solution absorber is inserted between the positive electrode and an inner bottom surface of the outer can.

Also, the method for manufacturing a flat-shaped battery of the present invention is directed to a method for manufacturing a flat-shaped battery in which a positive electrode, a negative electrode, a separator, and an electrolyte solution are enclosed in a battery container provided with an outer can and a sealing plate, the method including: disposing an electrolyte solution absorber on an inner bottom surface of the outer can; disposing the positive electrode on the electrolyte solution absorber; and injecting the electrolyte solution into the outer can after disposing the electrolyte solution absorber, before or after disposing the positive electrode, wherein a porous body having a porosity of 40 to 90% is used as the electrolyte solution absorber.

Effects of the Invention

The present invention can provide a flat-shaped battery that is excellent in productivity, and a method for manufacturing the battery.

DESCRIPTION OF THE INVENTION

The flat-shaped battery of the present invention is a battery in which a positive electrode, a negative electrode, a separator, and an electrolyte solution are enclosed in a battery container provided with an outer can and a sealing plate. The positive electrode is housed in the outer can, and a porous electrolyte solution absorber is inserted between the positive electrode and an inner bottom surface of the outer can.

Figure 1:
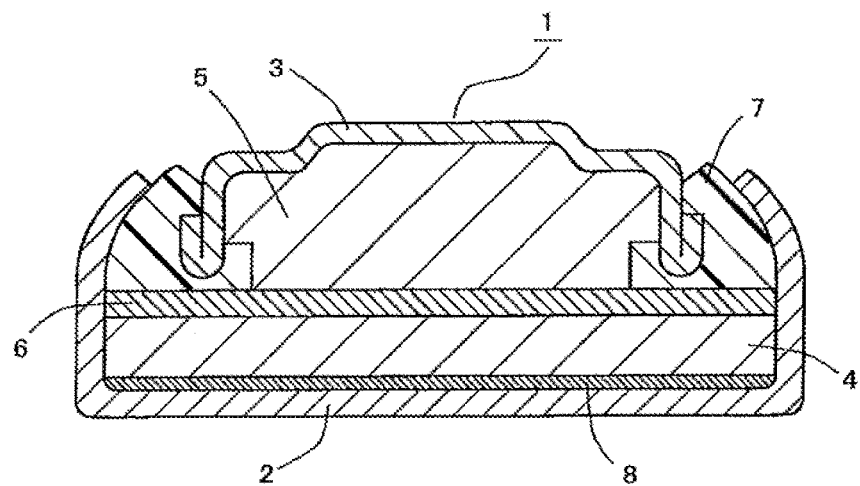
FIG. 1 is a cross-sectional view schematically showing an example of the flat-shaped battery of the present invention.

FIG. 1 is a cross-sectional view schematically showing an example of the flat-shaped battery of the present invention. In the flat-shaped battery 1 shown in FIG. 1, a sealing plate 3 provided with a negative electrode 5 is fitted into the opening of an outer can 2 in which a positive electrode 4 and a separator 6 are placed, with an annular gasket (resin gasket) 7 having an L-shaped cross section interposed between the sealing plate 3 and the outer can 2. As a result, the edge of the opening of the outer can 2 is tightened inward to bring the gasket 7 into contact with the sealing plate 3, and as a result, the opening of the outer can 2 is sealed to provide a sealed structure inside the battery. That is, the battery shown in FIG. 1 is configured such that power generation components including the positive electrode 4, the negative electrode 5, and the separator 6 are placed in a space (closed space) of a battery container that is constituted by the outer can 2, the sealing plate 3, and the gasket 7, and in addition, an electrolyte solution (not shown) is injected in the space and held in the separator. The outer can 2 also serves as a positive electrode terminal, and the sealing plate 3 also serves as a negative electrode terminal.

Also, in the flat-shaped battery 1, a porous electrolyte solution absorber 8 is inserted between the positive electrode 4 and the inner bottom surface of the outer can 2.

In the flat-shaped battery of the present invention, during manufacturing it, the electrolyte solution absorber is housed on the inner bottom surface of the outer can in advance. Then, when the electrolyte solution is injected into the outer can prior to placement of the positive electrode, or the electrolyte solution is injected into the outer can in which the positive electrode has been placed, the electrolyte solution absorber absorbs and retains a certain amount of electrolyte solution, whereby leakage of the electrolyte solution is greatly suppressed. Thus, according to the present invention, it is possible to enhance the productivity of the flat-shaped battery.

The electrolyte solution absorber can be a porous sheet or the like. Examples of the electrolyte solution absorber can include: porous sheets made of resin (also including porous sheets made of paper), such as nonwoven fabrics, for example, nonwoven fabrics mainly made of vinylon and rayon, vinylon-rayon nonwoven fabrics (vinylon-rayon mixed paper), polyamide nonwoven fabrics, polyolefin-rayon nonwoven fabrics, and such as vinylon paper, vinylon-linter pulp paper, and vinylon-mercerized pulp paper; and porous carbon sheets. Examples of the porous carbon sheets that can be used as the electrolyte solution absorber can include: carbon paper, carbon cloth, carbon felt, and the like that are made of fibrous carbon; and formed sheets made of expanded graphite. The same material as that of the separator can also be used.

The porosity of the electrolyte solution absorber can be preferably 40% or more and more preferably 60% or more, because this enhances its function of favorably absorbing and retaining the electrolyte solution. However, if the porosity of the electrolyte solution absorber is too high, the function of retaining the electrolyte solution could be deteriorated. Accordingly, the porosity of the electrolyte solution absorber can be preferably 90% or less and more preferably 80% or less.

In the present specification, the porosity P (%) of the electrolyte solution absorber can be calculated based on the thickness and the mass per area of the electrolyte solution absorber and the densities of constituent components, by obtaining a sum for each component i using the following expression (1).

$$P = \{1 - (m/t)/(\Sigma a_i \cdot \rho_i)\} \times 100 \quad (1)$$

Here, in the expression (1) above, $a_i$ is a ratio of the component i when the total mass is 1, $\rho_i$ is the density (g/cm$^3$) of the component i, m is the mass per unit area (g/cm$^2$) of the electrolyte solution absorber, and t is the thickness (cm) of the electrolyte solution absorber. The mass per unit area m of the electrolyte solution absorber is obtained by measuring the mass of a 20 square centimeter piece that has been cut out from the electrolyte solution absorber using an electronic scale, and calculating a mass per 1 cm$^2$ based thereon, and the thickness t of the electrolyte solution absorber is obtained by measuring thicknesses at ten randomly set measurement positions using a micrometer and obtaining an average thereof.

Further, from the viewpoint of allowing the electrolyte solution absorber to absorb the electrolyte solution quickly, the average pore diameter of the electrolyte solution absorber can be preferably 1 µm or more, and more preferably 5 µm or more, and furthermore preferably 20 µm or more.

However, if the pore diameter of the electrolyte solution absorber is too large, the function of retaining the electrolyte solution could be deteriorated. Accordingly, the average pore diameter of the electrolyte solution absorber can be preferably 150 µm or less, more preferably 100 µm or less, and furthermore preferably 50 µm or less.

In the present specification, the average pore diameter of the electrolyte solution absorber refers to a value measured according to a bubble point method specified in JIS K 3832.

Moreover, from the viewpoint of allowing the electrolyte solution absorber to retain a somewhat large amount of electrolyte solution, the thickness of the electrolyte solution absorber can be preferably 30 µm or more and more preferably 50 µm or more.

However, if the electrolyte solution absorber is too thick, it becomes necessary to reduce the amount of the positive electrode and the amount of the negative electrode in the battery, and this could cause reduction in capacity. Accordingly, the thickness of the electrolyte solution absorber can be preferably 500 µm or less, more preferably 300 µm or less, furthermore preferably 150 µm or less, and particularly preferably 100 µm or less.

Although there is no particular limitation on the area of the electrolyte solution absorber as viewed in a plan view provided that it can absorb an amount of electrolyte solution sufficient for preventing leakage, the proportion of the area of the electrolyte solution absorber with respect to 100% of the area of the inner bottom surface of the outer can be preferably 50% or more, more preferably 80% or more, and furthermore preferably 90% or more. The area of the electrolyte solution absorber as viewed in a plan view can also be equal to the area of the inner bottom surface of the outer can (that is, the proportion is 100% with respect to 100% of the area of the inner bottom surface of the outer can). However, typically, it is sufficient that the ratio is about 95 to 99%.

When the flat-type battery employs an electrolyte solution absorber made of, for example, a conductive material such as a porous carbon sheet, the positive electrode and the outer can are electrically connected to each other via the electrolyte solution absorber, and thus, the use of the electrolyte solution absorber does not impair current collection from the positive electrode. However, when the flat-type battery employs an insulating electrolyte solution absorber such a resin sheet, a contact portion between the positive electrode and the inner bottom surface of the outer can is small, and thus, current collection from the positive electrode might be insufficient. Accordingly, in the flat-type battery, it is preferable that the positive electrode and the side wall of the outer can are electrically connected to each other. This allows current collection from the positive electrode to be well performed even in the case where an insulating electrolyte solution absorber is used.

The electrical connection between the positive electrode and the side wall of the outer can be achieved, for example, through direct contact of the side surface of the positive electrode with the side wall of the outer can as shown in FIG. 1, or alternatively, by holding the positive electrode on a metal base and bringing this metal base into contact with the side wall of the outer can.

Figure 2:
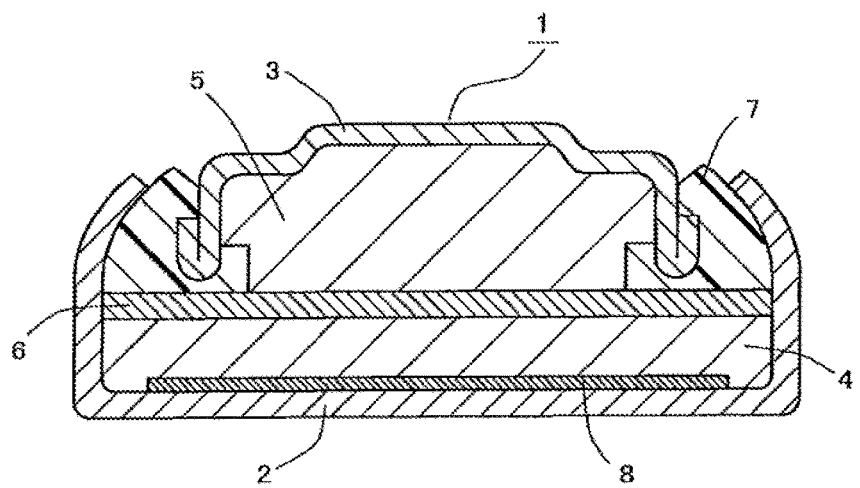
FIG. 2 is a cross-sectional view schematically showing another example of the flat-shaped battery of the present invention.

FIG. 2 is a cross-sectional view schematically showing another example of the flat-shaped battery of the present invention. The electrical connection between the positive electrode and the outer can of the flat-shaped battery can be achieved, as shown in FIG. 2, by setting the area of the electrolyte solution absorber as viewed in a plan view to be smaller than the area of the inner bottom surface of the outer can, and bringing the peripheral edge of the bottom surface of the positive electrode that faces the inner bottom surface of the outer can into contact with the inner bottom surface of the outer can.

The flat-shaped battery of the present invention can be in the form of any of a primary battery and secondary battery that include a non-aqueous electrolyte solution, and a primary battery and secondary battery that include an aqueous electrolyte solution.

When an aqueous electrolyte solution is used, some electrolyte solution absorbers such as porous carbon sheets are typically water-repellent, and thus there are cases where the electrolyte solution is unlikely to be absorbed, and the effects of the present invention cannot sufficiently be realized. In such cases, hydrophilization processing can be applied to improve the liquid absorption properties of the electrolyte solution absorber, thereby preventing the above-described problem.

The hydrophilization processing can be performed, for example, by using a method in which a water-repellent porous sheet such as a porous carbon sheet for configuring the electrolyte solution absorber is immersed into a processing liquid that contains a surface acting agent to attach the surface acting agent to the surface of the carbon, a method in which processing such as electrolytic oxidation or oxidation in an acid solution is applied to attach a functional group to a surface of the carbon, a method in which plasma processing or the like is applied to roughen a surface of the carbon, or the like.

Also, a secondary battery typically requires a larger amount of electrolyte solution than a primary battery, and thus leakage of the electrolyte solution is likely to occur in the secondary battery during manufacturing thereof. Therefore, when the flat-shaped battery of the present invention is a secondary battery, the effects thereof can be more significant.

The following will describe in detail a configuration of the flat-shaped battery, taking an alkaline battery, which is a main form of the present invention, as an example.

When the flat-shaped battery is an alkaline battery, the positive electrode can employ a chemical compound such as silver oxide, or nickel oxyhydroxide that is available as a positive electrode active material of an alkaline primary battery or an alkaline secondary battery, and examples of the chemical compound include a molded body of a positive electrode mixture that contains a positive electrode active material and a conductive assistant, and a structure in which a molded body of a positive electrode mixture is formed as a positive electrode mixture layer on one side or both sides of a current collector.

When silver oxide is used as a positive electrode active material, AgO or $Ag_2O$ can be used.

Although there is no particular limitation on the particle size of the silver oxide, the silver oxide has an average particle diameter of preferably 10 μm or less and more preferably 2 μm or less. Particularly, when the alkaline battery is used as a secondary battery, use of silver oxide having such a dimension improves the usage efficiency during charging, and a large charging capacity is obtained even if the charge end voltage is set to a relatively low voltage. Thus, it is possible to further improve the charge-discharge cycle characteristics of the battery, and suppress swelling of the battery that could be caused due to an increased charge end voltage, for example.

However, it is difficult to produce and handle silver oxide if its particle diameter is too small. Thus, the average particle diameter of the silver oxide can be preferably 0.01 μm or more and more preferably 0.03 μm or more.

In the present specification, the particle sizes of silver oxide and other particles (graphite particles, carbon black particles, insulating inorganic particles, and zinc particles of the negative electrode) are measured by using a laser scattering particle size distribution analyzer (e.g., "LA-920" manufactured by HORIBA, Ltd.) in a state where these particles are dispersed in a medium that does not dissolve the particles.

The examples of the conductive assistant in the positive electrode mixture can include particles of carbonaceous materials such as carbon black particles and graphite particles. As the conductive assistant, it is more preferable to use carbon black particles and graphite particles in combination.

Use of carbon black particles facilitates the formation of a favorable conductive network in the molded body of the positive electrode mixture. Thus, for example, compared with the case where only graphite particles is used, the number of contact points with the silver oxide as the positive electrode active material can increase, thereby enabling a further reduction in the electric resistance in the molded body of the positive electrode mixture effectively. For example, when the alkaline battery is used as a secondary battery, this can improve the reaction efficiency of the positive electrode active material during charging.

On the other hand, in the case where only carbon black particles are used, it may be necessary to use a binder to improve the formability depending on the thickness of the molded body of the positive electrode mixture. However, when graphite particles are used in combination with carbon black particles, the formability of the positive electrode mixture can be improved. Thus, for example, even when the molded body of the positive electrode mixture has a small thickness of 0.4 mm or less or more preferably 0.3 mm or less, the formability thereof can be improved, thereby easily preventing the occurrence of defects in production without using a binder.

The graphite particles to be used in the positive electrode mixture can be either natural graphite particles (such as flake graphite particles) or artificial graphite particles. One of them can be used alone, or two or more of them can be used in combination.

As described above, graphite particles have a function of improving the formability of the molded body of the positive electrode mixture. From the viewpoint of allowing graphite particles to exhibit this function more favorably, the average particle diameter of the graphite particles can be preferably 1 µm or more and more preferably 2 µm or more. Also, from the viewpoint of improving the conductivity, the average particle diameter of the graphite particles can be preferably 7 µm or less and more preferably 5 µm or less.

Examples of carbon black particles to be used in the positive electrode mixture can include furnace black, channel black, acetylene black, and thermal black. One of them can be used alone, or two or more of them can be used in combination. Of the particles of these carbon blacks, it is preferable to use acetylene black, as it is highly conductive and contains few impurities.

When the alkaline battery is a secondary battery, in the case where silver oxide is used as the positive electrode active material, it is preferable that the positive electrode mixture further contains insulating inorganic particles, thereby enabling a further improvement in charge-discharge cycle characteristics of the battery. In the case where insulating inorganic particles are used, when the positive electrode mixture further contains carbon black particles and graphite particles in addition to the insulating inorganic particles, still further improvement in charge-discharge cycle characteristics can be achieved.

Examples of the insulating inorganic particles to be used in the positive electrode mixture can include particles of oxides of at least one element selected from Si, Zr, Ti, Al, Mg, and Ca. Specific examples of the oxides can include $Al_2O_3$, $TiO_2$, $SiO_2$, $ZrO_2$, MgO, CaO, AlOOH, and $Al(OH)_3$. It is preferable to use particles that are insoluble or poorly soluble in the alkaline electrolyte solution. One of these insulating inorganic particles can be used alone, or two or more of them can be used in combination.

If the particle diameter of the insulating inorganic particles is too large, the effect of improving the charge-discharge cycle characteristics of the battery could be reduced. Accordingly, from the viewpoint of improving the charge-discharge cycle characteristics of the battery more favorably, the average particle diameter of the insulating inorganic particles can be preferably 0.5 µm or less and more preferably 0.3 µm or less.

If the particle diameter of the insulating inorganic particles is too small, the effect of improving the charging efficiency of the battery (initial capacity) could be reduced. Accordingly, from the viewpoint of improving the charging efficiency of the battery more favorably, the average particle diameter of the insulating inorganic particles can be preferably 0.01 µm or more and more preferably 0.05 µm or more.

Regarding the composition of the positive electrode mixture, when silver oxide is used as the positive electrode active material to ensure the capacity, the content of the silver oxide can be preferably 60 mass % or more, more preferably 80 mass % or more, and particularly preferably 90 mass % or more, with respect to 100 mass % of the entire solid content constituting the positive electrode mixture, for example.

The content of the conductive assistant in the positive electrode mixture can be preferably 0.2 mass % or more, more preferably 0.5 mass % or more, and particularly preferably 1 mass % or more from the viewpoint of the conductivity. On the other hand, in order to prevent the reduction in capacity and the generation of gas during charging, the content of the conductive assistant can be preferably 8 mass % or less, more preferably 7 mass % or less, still more preferably 5 mass % or less, and particularly preferably 3 mass % or less.

When carbon black particles and graphite particles are contained in the positive electrode mixture, the content of the graphite particles can be preferably 1 mass % or more and more preferably 2 mass % or more, from the viewpoint of favorably ensuring the effects of improving the charging efficiency and the charge-discharge cycle characteristics of the battery brought about by using the graphite particles in combination with the carbon black particles. Also, when the carbon black particles and the graphite particles are contained in the positive electrode mixture, the content of the graphite particles can be preferably 7 mass % or less and more preferably 4 mass % or less from the viewpoint of for example, preventing the capacity of the battery from being reduced owing to an excessively small amount of the positive electrode active material in the positive electrode mixture.

When carbon black particles and graphite particles are contained in the positive electrode mixture, the content of the carbon black particles can be preferably 0.1 mass % or more and more preferably 0.5 mass % or more, from the viewpoint of favorably ensuring the effects of improving the charging efficiency and the charge-discharge cycle characteristics of the battery brought about by using the carbon black particles in combination with the graphite particles. However, if the amount of the carbon black particles in the positive electrode mixture is too large, considerable swelling of the positive electrode could occur when the battery is stored under a high temperature condition, for example. Accordingly, from the viewpoint of suppressing swelling of the positive electrode during storage of the battery (in particular, storage at a high temperature of around 60° C.) in order to improve the storage characteristics of the battery, the content of the carbon black particles in the positive electrode mixture when the carbon black particles and the graphite particles are contained in the positive electrode mixture can be preferably 1.5 mass % or less and more preferably 1 mass % or less.

When insulating inorganic particles are contained in the positive electrode mixture, the content thereof can be preferably 0.1 mass % or more and more preferably 3 mass % or more from the viewpoint of favorably ensuring the effects brought about by using the insulating inorganic particles (in particular, the effect of improving the charge-discharge cycle characteristics in the case of the battery). However, if the amount of the insulating inorganic particles in the positive electrode mixture is too large, the capacity of the battery could decrease as the filling amount of the positive electrode active material decreases, and further, the discharge capacity could drop suddenly when the charging-discharging cycle has proceeded, depending on the type of the insulating inorganic particles. Therefore, the content of the insulating inorganic particles in the positive electrode mixture can be preferably 7 mass % or less, and more preferably 5 mass % or less.

As described above, the positive electrode mixture can be formed without using a binder. However, a binder can be used when it is necessary to increase the strength (e.g., when graphite is not used as a conductive assistant). Examples of a binder to be used in the positive electrode mixture can include fluororesins such as polytetrafluoroethylene (PTFE). When a binder is used, the content of the binder in the positive electrode mixture can be preferably 0.1 to 20 mass %.

When the positive electrode consists of only a molded body of a positive electrode mixture, the positive electrode can be produced by, for example, mixing a positive electrode active material, a conductive assistant, and when necessary, an alkaline electrolyte solution (which can be the same as an alkaline electrolyte solution injected into the battery) to prepare a positive electrode mixture and then pressure-molding the positive electrode mixture into a predetermined shape.

When the positive electrode is formed of a molded body of a positive electrode mixture (a positive electrode mixture layer) and a current collector, the positive electrode can be produced by, for example, dispersing a positive electrode active material, a conductive assistant, and the like in water or an organic solvent such as N-methyl-2-pyrrolidone (NMP) to prepare a positive electrode mixture-containing composition (slurry, paste, or the like), applying the composition to the current collector, then drying the composition, and when necessary, subjecting the current collector with the composition to pressing such as calendering.

It is to be noted, however, that the positive electrode is not limited to those produced by the above-described methods, and can be produced by other methods.

When the positive electrode consists of only a molded body of a positive electrode mixture, the thickness thereof can be preferably 0.15 to 4 mm. On the other hand, when the positive electrode is formed of a positive electrode mixture layer and a current collector, the thickness of the positive electrode mixture layer (the thickness thereof per one side of the current collector) can be preferably 30 to 300 μm.

When a current collector is used for the positive electrode, the current collector can be made of, for example, a stainless steel such as SUS316, SUS430, or SUS444, aluminum, or an aluminum alloy. The current collector can be in the form of for example, a plain-woven wire mesh, an expanded metal, a lath mesh, a perforated metal sheet, a metal foam, or a foil (plate). The thickness of the current collector can be preferably 0.05 to 0.2 mm, for example. It is also desirable to apply a conductive material in the form of a paste, such as a carbon paste or as silver paste, to a surface of the current collector.

When the flat-shaped battery is an alkaline battery, zinc particles, i.e., particles made of pure zinc (containing unavoidable impurities) or a zinc alloy are used in the negative electrode. In such a negative electrode, zinc contained in the particles acts as an active material of the electrode. Examples of an alloy component in zinc alloy particles include indium, bismuth, and aluminum (the remainder is composed of zinc and unavoidable impurities). The zinc particles contained in the negative electrode can consist of one type of particles with a single composition, or contain two or more types of particles with different compositions.

It should be noted that it is preferable to use zinc particles that do not contain mercury as an alloy component. Use of such zinc particles in batteries can reduce environmental pollution caused when discarding the batteries. Also, it is preferable to use zinc particles that do not contain lead as an alloy component for the same reason as described for mercury.

The particle size of zinc particles can be as follows, for example: the proportion of particles with a particle diameter of 75 μm or less in all particles can be preferably 50 mass % or less and more preferably 30 mass % or less; or the proportion of particles with a particle diameter of 100 μm to 200 μm in all particles can be preferably 50 mass % or more and more preferably 90 mass % or more.

In addition to the above-described zinc particles, the negative electrode can further contain, for example, a gelling agent (such as sodium polyacrylate or carboxymethyl cellulose) when necessary. This can be mixed with an alkaline electrolyte solution to form a negative electrode agent (gel-like negative electrode). The amount of the gelling agent in the negative electrode can be preferably 0.5 to 1.5 mass %, for example.

The negative electrode can be a non-gel negative electrode that is substantially free of the above-described gelling agent (A non-gel negative electrode can contain a gelling agent as long as the viscosity of an alkaline electrolyte solution present in the vicinity of zinc particles does not increase. Thus, the phrase "substantially free of a gelling agent" means that the gelling agent can be contained to the extent that it does not affect the viscosity of the alkaline electrolyte solution.). In the case of a gel-like negative electrode, an alkaline electrolyte solution is present together with a gelling agent in the vicinity of zinc particles. However, the viscosity of the alkaline electrolyte solution increases owing to the action of the gelling agent. This hinders the movement of the alkaline electrolyte solution, which, in turn, hinders the movement of ions in the electrolyte. It is considered that this reduces the reaction rate in the negative electrode, thereby hindering the improvement in load characteristics (in particular, heavy load characteristics) of the battery. To address this problem, by using a non-gel negative electrode, an increase in the viscosity of an alkaline electrolyte solution present in the vicinity of zinc particles is not caused and the moving speed of ions in the alkaline electrolyte solution can be kept high. As a result, the reaction rate in the negative electrode can be increased, whereby the load characteristics (in particular, heavy load characteristics) can be further improved.

The alkaline electrolyte solution contained in the negative electrode can be the same as an alkaline electrolyte solution to be injected into the battery.

The content of the zinc particles in the negative electrode can be, for example, preferably 60 mass % or more and more preferably 65 mass % or more, and also, preferably 75 mass % or less and more preferably 70 mass % or less.

The negative electrode preferably contains an indium compound. When the negative electrode contains an indium compound, the generation of gas due to a corrosion reaction between the zinc particles and the alkaline electrolyte can be prevented more effectively.

The above-described indium compound can be, for example, indium oxide or indium hydroxide.

The amount of the indium compound used in the negative electrode can be preferably 0.003 to 1 with respect to 100 of the zinc particles in terms of mass ratio.

When the flat-shaped battery is an alkaline battery, a separator is interposed between the positive electrode and the negative electrode. Examples of the separator that can be used in the alkaline battery can include nonwoven fabrics mainly made of vinylon and rayon, vinylon-rayon nonwoven fabrics (vinylon-rayon mixed paper), polyamide nonwoven fabrics, polyolefin-rayon nonwoven fabrics, vinylon paper, vinylon-linter pulp paper, and vinylon-mercerized pulp paper. The separator can be a microporous polyolefin film (such as a microporous polyethylene film or a microporous polypropylene film) that has been subjected to a hydrophilic treatment, or a laminate of a cellophane film and a liquid absorbing layer (electrolyte solution retaining layer) such as vinylon-rayon mixed paper. The thickness of the separator can be preferably 20 to 500 μm.

When the flat-shaped battery is an alkaline secondary battery, it can be preferable to dispose, between the positive electrode and the negative electrode, an anion conductive membrane in which a polymer is used as a matrix and particles of at least one metal compound selected from the group consisting of metal oxides, metal hydroxides, metal carbonates, metal sulfates, metal phosphates, metal borates, and metal silicates are dispersed in the matrix.

When the flat-shaped battery is an alkaline battery, a suitable alkaline electrolyte solution to be used in the battery is an aqueous solution containing one or more alkali metal hydroxides (such as sodium hydroxide, potassium hydroxide, and lithium hydroxide). Of these metal hydroxides, potassium hydroxide is particularly preferable. When the alkaline electrolyte solution is, for example, an aqueous solution of potassium hydroxide, the concentration of the alkaline electrolyte solution is such that the amount of the potassium hydroxide in the electrolyte solution can be preferably 20 mass % or more and more preferably 30 mass % or more and can be preferably 40 mass % or less and more preferably 38 mass % or less. By adjusting the concentration of the aqueous solution of the potassium hydroxide to such a value, it is possible to provide an alkaline electrolyte solution with excellent conductivity.

In addition to the above-described components, various known additives can be added to the alkaline electrolyte solution when necessary to the extent that the effects of the present invention are not impaired. For example, zinc oxide can be added to prevent corrosion (oxidation) of the zinc particles used in the negative electrode of the alkaline battery. Note here that zinc oxide can be added to the negative electrode as well.

When the flat-shaped battery is an alkaline secondary battery, from the viewpoint of improving the charge-discharge cycle characteristics of the battery, at least one selected from the group consisting of manganese compounds, tin compounds, and indium compounds can be dissolved in the alkaline electrolyte solution.

Furthermore, when the flat-shaped battery is an alkaline secondary battery an additive selected from polyalkylene glycols and calcium compounds can be preferably contained in at least one of the negative electrode, the alkaline electrolyte solution, and the separator. In this case, polyalkylene glycols and calcium compounds can inhibit the growth of zinc dendrites in the negative electrode, thereby enabling a further improvement in the charge-discharge cycle characteristics of the alkaline battery (when the alkaline battery is a secondary battery) and in the storage characteristics of the alkaline battery.

When the flat-shaped battery is an alkaline secondary battery, it can be preferable that any of the members in the battery, for example, at least one of the positive electrode, the negative electrode, and the separator, or an alkaline electrolyte solution can contain tellurium or a chemical compound thereof (such as tellurium dioxide), thereby improving the charge-discharge cycle characteristics and load characteristics of the battery.

When the flat-shaped battery is an alkaline battery, the outer can and the sealing plate can be formed of iron or stainless steel plated with nickel, for example. To prevent elution of elements constituting the outer can such as iron during charging, it is desirable to plate the inner surface of the outer can with a corrosion-resistant metal such as gold.

A metal layer made of copper or a copper alloy such as brass can be preferably formed on a surface of the sealing plate on the side to be in contact with the negative electrode. Furthermore, a tin layer is more preferably formed on the surface of the metal layer.

Furthermore, when the flat-shaped battery is an alkaline battery, the gasket can be made of a resin such as polyamide (such as nylon 66).

The shape of the flat-shaped battery as viewed in a plan view can be a circular shape or a polygonal shape such as a quadrangular (square or rectangular) shape. When the battery has a polygonal shape, it can have curved corners.

The flat-shaped battery can be manufactured, for example, in the following procedure. The electrolyte solution absorber is disposed on the inner bottom surface of the outer can. Thereafter, an electrolyte solution is injected into the outer can and then the positive electrode is disposed, or the positive electrode is disposed in the outer can and then an electrolyte solution is injected. The resultant and the sealing plate that houses the negative electrode and to which the gasket is mounted are fitted between the positive electrode and the negative electrode with the separator interposed therebetween, and are sealed through crimping, thereby manufacturing the flat-shaped battery. Note that when the electrolyte solution is injected into the outer can in which the positive electrode is housed, the separator can also be placed on the positive electrode.

EXAMPLES

Hereinafter, the present invention will be described in detail with reference to examples. It should be noted that the following examples do not restrict the present invention.

Example 1

90.3 parts by mass of silver(I) oxide ($Ag_2O$) having an average particle diameter of 1.4 μm and containing 3.7% (on a mass basis) of Bi with respect to the total amount of silver, 3.8 parts by mass of graphite particles (BET specific surface area: 20 $m^2/g$, average particle diameter: 3.7 μm), 1.9 parts by mass of carbon black (acetylene black, BET specific surface area: 68 $m^2/g$, average particle diameter of primary particles: 35 nm), 1 part by mass of $TiO_2$ particles (average particle diameter: 250 nm), and 3 parts by mass of polytetrafluoroethylene (PTFE) were mixed together to prepare a positive electrode mixture that is substantially free of cadmium.

73 mg of this positive electrode mixture was packed into a mold at a packing density of 5.7 $g/cm^3$ and pressure-molded into a disk shape with a diameter of 5.2 mm and a height of 0.6 mm. Thus, a positive electrode mixture molded body was produced.

As a negative electrode active material, mercury-free zinc alloy particles that had been widely used in alkaline primary batteries and contained In (500 ppm), Bi (400 ppm), and Al (10 ppm) as additive elements were used. The particle size of the zinc alloy particles was determined by the above-described method. As a result, it was found that the average particle diameter (D50) was 120 μm and the proportion of the particles with a particle diameter of 75 μm or less was 25 mass % or less.

The above-described zinc alloy particles and ZnO were mixed together at a ratio (mass ratio) of 97:3. Thus, a composition for forming a negative electrode (negative electrode composition) was obtained 18 mg of this composition was weighed out and used to prepare the negative electrode.

Potassium hydroxide in a concentration of 35 mass % was dissolved in the alkaline electrolyte solution. Furthermore, as a solution in which zinc oxide in a concentration of 3 mass % was dissolved, a mixed solution in which lithium hydroxide in a concentration of 1 mass %, polyethylene glycols in a concentration of 1 mass %, and tellurium dioxide in a concentration of 9.2 mass % were dissolved was used. The content of tellurium in the electrolyte solution was 7.4 mass %.

5 g of an aqueous dispersion of PTFE (solid content: 60 mass %), 2.5 g of an aqueous solution of sodium polyacrylate (concentration: 2 mass %), and 2.5 g of hydrotalcite particles (average particle diameter: 0.4 μm) were kneaded together and then subjected to rolling to form a membrane with a thickness of 100 μm. Then, a circular piece with a diameter of 5.6 mm was punched out of the membrane. Thus, an anion conductive membrane was produced.

Two graft films (thickness: 30 μm) each composed of a graft copolymer obtained through graft copolymerization of acrylic acid with a polyethylene main chain were disposed on both sides of a cellophane film (thickness: 20 μm) to form a multilayer film, and vinylon-rayon mixed paper (thickness: 100 μm) was laminated on this multilayer film. A circular piece with a diameter of 5.6 mm was punched out of the thus-obtained laminate, and the above-described anion conductive membrane was further laminated thereon, thereby obtaining a separator.

The electrolyte solution absorber (porosity: 65%, the average pore diameter: 20 μm, and the thickness: 100 μm) that had a disk shape with a diameter of 5.5 mm and was made of vinylon-rayon nonwoven fabrics was disposed on the inner bottom surface of the outer can made of a steel plate whose inner surface was plated with gold, and the above-described positive electrode (positive electrode mixture molded body) was disposed thereon. Then, 9 μL of the alkaline electrolyte solution was dripped thereon. With a procedure in which the outer can, and the sealing plate that houses the negative electrode (negative electrode composition) and is made of a copper-stainless steel (SUS304)-nickel clad plate to which an annular gasket made of nylon 66 was fitted were fitted between the positive electrode and the negative electrode with the separator interposed therebetween, and were sealed through crimping, a flat-shaped alkaline secondary battery having the same structure as that shown in FIG. 1, and having a diameter of 5.8 mm and a thickness of 2.7 mm was assembled. Note that the separator was arranged so that the anion conductive membrane faced the negative electrode.

Comparative Example 1

A flat-shaped alkaline secondary battery was produced in the same manner as in Example 1, except that the electrolyte solution absorber was not used.

The flat-shaped alkaline secondary batteries of Example 1 and Comparative Example 1 were evaluated as follows.
<Evaluation of Leakage Occurrence During Manufacturing>

The number of times leakage occurred when twenty flat-shaped alkaline secondary batteries of each of Example 1 and Comparative Example 1 were assembled was counted.
<Discharge Characteristic Evaluation>

The batteries (in which no leakage occurred during the assembly) of Example 1 and Comparative Example 1 were discharged at a current value of 1.0 mA until the voltage reached 1.0 V, and discharge capacities were measured.

Results of the evaluations are given in Table 1.

TABLE 1

|  | Number of leaks during assembly (number of batteries/20) | Discharge capacity (mAh) |
| --- | --- | --- |
| Example 1 | 0 | 9.5 |
| Comparative Example 1 | 15 | 9.4 |

As shown in Table 1, some of the flat-shaped alkaline secondary batteries of Comparative Example 1 including no electrolyte solution absorber caused leakage during the assembly. In contrast, in the flat-shaped alkaline secondary batteries of Example 1, the occurrence of leakage during the assembly was not observed owing to the function of the electrolyte solution absorber, and it was found that these batteries thus had good productivity.

In the battery of Example 1, the electrolyte solution absorber made of an insulating material was used. However, since the battery of Example 1 was configured such that the positive electrode and the side wall of the outer can were electrically connected to each other, the battery of Example 1 could achieve a discharge capacity equivalent to that of the battery in Comparative Example 1 including no electrolyte solution absorber.

Example 2

<Production of Positive Electrode>

As the positive electrode active material, 94.3 parts by mass of granulated silver(I) oxide having an average particle diameter of 150 μm and a bulk density of 2.4 g/cm$^3$, 1.9 parts by mass of acetylene black particles having a BET specific surface area of 68 m$^2$/g and an average particle diameter of primary particles of 35 nm, and 3.8 parts by mass of graphite particles having a BET specific surface area of 20 m$^2$/g and an average particle diameter of 3.7 μm were mixed together to produce a mixture, and 91 mg of this mixture was pressure-molded into a disk shape. Thus, a positive electrode mixture molded body having a packing density of 5.35 g/cm$^3$ and a diameter of 6.4 mm was produced.
<Carbon Sheet Hydrophilization Processing>

As a porous carbon sheet to be inserted between the positive electrode and the inner bottom surface of the outer can, a carbon sheet manufactured by FREUDENBERG (thickness: 140 μm, basis weight: 66 g/m$^2$, air permeability: 60 second/100 ml) was used. A piece with a diameter of 6.4 mm was punched out of the carbon sheet, and was then subjected to hydrophilization processing in which the piece was immersed in a processing solution obtained by dispersing a fluorine surface acting agent "SURFLON S-242 (product name)" (manufactured by AGC SEIMI CHEMICAL CO., LTD) at a density of 1 mass % in water, was taken out therefrom, and was then dried at 60° C. for 15 minutes.
<Battery Assembly>

As a negative electrode, mercury-free zinc particles having an average particle diameter of 120 μm such that the proportion of particles with a particle diameter of 75 μm was 10 mass % or less, and the proportion of particles with a particle diameter of 100 to 150 μm was 90 mass % or more, and containing In of 0.05 mass % (500 ppm), Bi of 0.04 mass % (400 ppm), and Al of 0.001 mass % (10 ppm) was used.

A gasket made of nylon 66 was fitted to a sealing plate produced by using a clad plate having a three-layer structure of copper-stainless steel-nickel, and the inner space thereof was filled with 21 mg of the zinc particles. Furthermore, 12 μL of an alkaline electrolyte solution made of a water solution in which potassium hydroxide and zinc oxide were dissolved at respective concentrations of 30.6 mass % and 4 mass % was injected to configure a negative electrode.

The carbon sheet was disposed on the inner bottom surface of an outer can that was produced by using SUS430 and has an inner diameter of 6.4 mm, and 9 μL of the same alkaline electrolyte solution as the above-described one was injected onto the carbon sheet. Then, the positive electrode (the molded body of the positive electrode mixture) was disposed thereon. Furthermore, a laminated membrane ("YG2152" manufactured by Yuasa Membrane Systems Co., Ltd.) in which a cellophane film having a thickness of 20 μm and a graft film having a thickness of 30 μm composed of a graft copolymer obtained through graft copolymerization of acrylic acid with a polyethylene main chain are laminated, and vinylon-rayon mixed paper having a thickness of 100 μm were disposed on the positive electrode, and the electrolyte solution was absorbed by the positive electrode and the mixed paper. The sealing plate and the outer can were enclosed by the gasket, thereby producing a button-shaped alkaline battery.

In the battery of Example 2, no leakage of the electrolyte solution was observed during battery assembly.

Example 3

A button-shaped alkaline battery was produced in the same manner as in Example 2, except that a piece with a diameter of 6.4 mm punched out of the carbon sheet of Example 2 was used without being subjected to hydrophilization processing.

In the battery of Example 3, leakage of the electrolyte solution was observed in 50% of the assembled batteries.

Example 4

A button-shaped alkaline battery was produced in the same manner as in Example 2, except that in place of the carbon sheet of Example 2, a carbon sheet that has a thickness of 230 μm, a basis weight of 97 g/m², an air permeability of 50 second/100 ml and was subjected to the same hydrophilization processing as in Example 2 was used.

In the battery of Example 4, no leakage of the electrolyte solution was observed during battery assembly.

Example 5

A button-shaped alkaline battery was produced in the same manner as in Example 2, except that in place of the carbon sheet of Example 2, vinylon-rayon mixed paper having a thickness of 100 μm was used.

In the battery of Example 5, no leakage of the electrolyte solution was observed during battery assembly.

Comparative Example 2

A button-shaped alkaline battery was produced in the same manner as in Example 2, except that a carbon sheet was not disposed on the inner bottom surface of the outer can.

In Comparative Example 2, leakage of the electrolyte solution was observed in all of the assembled batteries.

Comparative Example 3

A button-shaped alkaline battery was produced in the same manner as in Comparative Example 2, except that the amount of an alkaline electrolyte solution to be injected into the outer can was changed to 2.5 μL.

In the battery of Comparative Example 3, no leakage of the electrolyte solution was observed during battery assembly.

The produced batteries were measured in the following items.

<Battery Discharge Capacity>

The batteries were discharged at a constant current of 0.05 mA at a room temperature, and discharge capacities until the battery voltages were reduced to 1V were acquired.

<Battery Load Characteristics>

While the batteries were discharged at a constant current of 20 mA at a room temperature, the battery voltages (closed circuit voltage) after 10 millisecond from the start of the discharge were measured, and the load characteristics of the batteries were evaluated.

Results of the measurements are given in Table 2.

TABLE 2

|  | Electrolyte solution absorber disposed on the inner bottom surface of the outer can | Proportion of batteries in which leakage occurred (%) | Discharge capacity (mAh) | Load characteristics (V) |
| --- | --- | --- | --- | --- |
| Example 2 | Porous carbon sheet Thickness: 140 μm Hydrophilized | 0 | 16.7 | 1.38 |
| Example 3 | Porous carbon sheet Thickness: 140 μm Not hydrophilized | 50 | 16.1 | 1.39 |
| Example 4 | Porous carbon sheet Thickness: 230 μm Hydrophilized | 0 | 16.8 | 1.39 |
| Example 5 | Vinylon-rayon mixed paper Thickness: 100 μm | 0 | 15.2 | 1.39 |
| Comparative Example 2 | — | 100 | 16.8 | 1.41 |
| Comparative Example 3 | — | 0 | 16.5 | 1.23 |

In the batteries of Examples 2 to 4, due to the porous carbon sheet disposed on the inner bottom surface of the outer can functioning as an electrolyte solution absorber, the proportion of batteries in which leakage occurred could be reduced although a large amount of electrolyte solution was injected into the outer can, compared with the batteries of Comparative Example 2 without any component disposed on the inner bottom surface of the outer can. Also, due to the carbon sheet also functioning as a current collector, batteries having excellent load characteristics could be realized similar to the batteries of Comparative Example 2 in which the positive electrode was brought into direct contact with and electrically connected to the inner bottom surface of the outer can.

Specifically, in the batteries of Examples 1 and 3 in which a carbon sheet subjected to hydrophilization processing was used, the liquid absorption properties of the carbon sheets were improved, and thus leakage of the electrolyte solution could be suppressed more effectively.

In contrast, in the battery of Example 5, the vinylon-rayon mixed paper disposed on the inner bottom surface of the outer could functioned as an electrolyte solution absorber, and could prevent leakage of the electrolyte solution. But, the inner bottom surface of the outer can and the bottom surface of the positive electrode were insulated, and thus discharge capacities were reduced compared with the batteries of Examples 2 to 4. The produced batteries could be discharged at the start of the discharge without any difficulty, since the positive electrode and the side wall of the outer can were in contact with and electrically connected to each other. On the other hand, the reason why the discharge capacities were reduced is considered to be that, when the volume of the positive electrode was changed in an end stage of the discharge, the electrical connection between the positive electrode and the side wall of the outer was unlikely to be ensured, and part of the positive electrode active material could not be discharged.

In the batteries of Comparative Example 3, the amount of electrolyte solution to be injected into the outer can was reduced, and thus leakage of the electrolyte solution could be prevented. But, the internal resistances of the batteries were increased, and the load characteristics were reduced.

The present invention can be embodied in other forms without departing from the point and scope of the present invention. The embodiments disclosed in this application are to be considered in all respects as illustrative and not limiting. The scope of the present invention is to be construed on the basis of the recitations in the appended claims rather than the foregoing description, and all changes that come within the range of equivalency of the claims are therefore intended to be embraced therein.

INDUSTRIAL APPLICABILITY

The flat-shaped battery of the present invention is applicable to usages in which a conventionally known primary battery or secondary battery is employed, based on the employed form.

DESCRIPTION OF REFERENCE NUMERALS

1 Flat-shaped battery
2 Outer can
3 Sealing plate
4 Positive electrode
5 Negative electrode
6 Separator
7 Gasket
8 Electrolyte solution absorber

The invention claimed is:

1. A flat-shaped battery comprising a battery container provided with an outer can and a sealing plate, and a positive electrode, a negative electrode, a separator, and an electrolyte solution are enclosed in the battery container,
    wherein the positive electrode is housed in the outer can, and a porous electrolyte solution absorber is inserted between the positive electrode and an inner bottom surface of the outer can, and
    wherein the electrolyte solution absorber is a porous carbon sheet or is made of a resin.

2. The flat-shaped battery according to claim 1,
    wherein an area of the electrolyte solution absorber as viewed in a plan view is 50% or more of an area of the inner bottom surface of the outer can.

3. The flat-shaped battery according to claim 1,
    wherein the electrolyte solution absorber has a thickness of 30 μm or more.

4. The flat-shaped battery according to claim 1,
    wherein the electrolyte solution is an aqueous electrolyte solution.

5. The flat-shaped battery according to claim 4,
    wherein the electrolyte solution absorber is subjected to hydrophilization processing.

6. The flat-shaped battery according to claim 1,
    wherein the porous carbon sheet is made of fibrous carbon.

7. The flat-shaped battery according to claim 1,
    wherein the electrolyte solution absorber is nonwoven fabric made of a resin.

8. The flat-shaped battery according to claim 1,
    wherein the positive electrode and a side wall of the outer can are electrically connected to each other.

9. The flat-shaped battery according to claim 8,
    wherein the positive electrode is in contact with an inner surface of the side wall of the outer can.

* * * * *